May 13, 1924.
W. WATTS
DENTAL IMPLEMENT
Filed Nov. 24, 1922
1,493,581
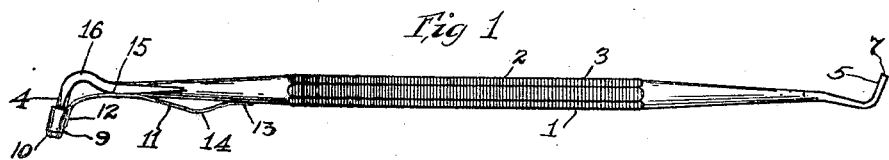
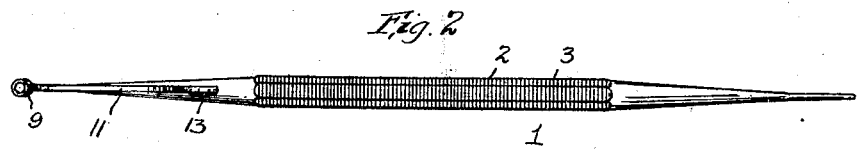
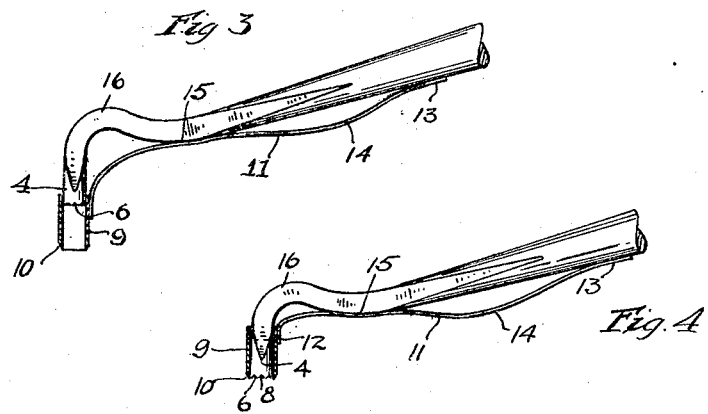
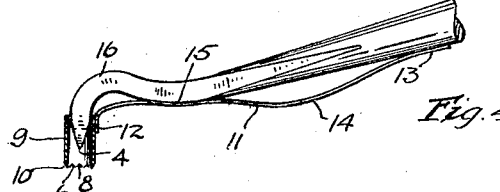
Walter Watts
INVENTOR.

Patented May 13, 1924.

1,493,581

UNITED STATES PATENT OFFICE.

WALTER WATTS, OF WASHINGTON, DISTRICT OF COLUMBIA.

DENTAL IMPLEMENT.

Application filed November 24, 1922. Serial No. 602,980.

*To all whom it may concern:*

Be it known that I, WALTER WATTS, a citizen of the United States, residing at Washington, in the District of Columbia, have invented a new and useful Improvement in Dental Implements, of which the following is a specification.

More particularly the invention relates to a single combined filling and plugging tool which serves to transfer the amalgam or other semi-plastic filling material to the cavity to be filled and to pack such material into the cavity as a single operation.

Filling implements as heretofore designed have utilized various arrangements of a tube, or sleeve, and plunger to carry the filling material to the place of use, but the necessary manipulation of the implement has been such as to seriously interfere with the accurate placing and subsequent compacting of the charge of material, and most operators having difficult fillings in the teeth at the rear of the jaw have used only the simple plugging implement to transfer the amalgam or other filling material to the cavity. This method has the disadvantage that only small portions of material may be handled at one time, and that, not infrequently the material is jarred from the end of the implement before the place of deposit is reached.

It is the object of my invention to provide a filling and plugging implement free of the defects referred to and one capable of being handled with facility equal to that with which the simple plugging implement is handled. At the same time adequate quantities of filling material may be handled and danger of dropping portions with the consequent discomfort of the patient and the possibility of moisture reaching the filling will be avoided.

To the accomplishment of the foregoing and related ends the invention then consists of the structure hereinafter described and particularly pointed out in the claims, the annexed drawings and the following description setting forth in detail certain structure embodying the invention, such disclosed structure constituting, however, but one of various mechanical forms in which the principle of the invention may be used.

In said annexed drawings:—

Figure 1 is a side elevation of the improved implement;

Figure 2 is a bottom plan view thereof;

Figure 3 is an enlarged detail view of the device with the sleeve, shown in section, in extended position; and Figure 4 is a view similar to Figure 3 with the sleeve shown in retracted or discharging position.

As is clearly shown in Figures 1 and 2 of the drawing, the dental implement is of the usual shape of a plugging tool 1 having a central portion 2 of octagonal cross-section and with the outer faces thereof having transverse grooves 3 of shallow depth to provide a gripping surface for the fingers of the operator.

The respective ends of the implement are tapered for a portion of their extent and are then bowed slightly out of alinement in opposite directions and finally are reversely turned to form plugging members 4, 5, inclined at an outward angle toward the body and turned in opposite directions to each other. The end faces 6, 7, of the implement are preferably provided with radial grooves 8 to more evenly distribute the filling material.

As is more clearly shown in Fig. 3 one end of the implement, which is preferably of larger diameter than the other, is provided with a sleeve or cylindrical section 9 of a size to have a sliding fit with said plugging end. The sleeve is preferably formed of thin metal of uniform gauge and its lower outer circumference is beveled to provide a thin contact edge 10 to permit it to be pressed into a quantity of amalgam or other filling material on the mixing plate without the use of any great degree of force.

The sleeve is maintained in position upon the plugging end of the implement by means of a spring 11, which is securely attached, by soldering or otherwise, at its outer end 12 to the upper side of the sleeve, and at its inner end 13, is soldered, pinned, or otherwise firmly secured to the tapered portion of the implement adjacent the octagonal central portion thereof. The spring is preferably a flat spring of great flexibility and is of somewhat greater length than a straight line between its points of connection. This additional length provides for an outwardly bowed portion 14 adjacent its point of attachment to the implement and a rolling contact or fulcrum on the curved portion 15 of the tapered section of the body, just in advance of the reversely bowed portion thereof.

The end of the implement supplied with the sleeve may have flattened sides 16 to give the same greater rigidity without the use of additional metal.

From the description of its construction the operation of the device will readily appear. Thus with the sleeve and the plugging end in the positions shown in Fig. 3, the beveled edge of the sleeve is pressed upon the mass of amalgam or other semi-plastic filling material on the plate, and the interior of the sleeve is filled with a quantity of such material. It is unnecessary to exert sufficient pressure to deflect the spring and change the relative positions of the sleeve and plugging end of the implement. The filled end of the implement is then positioned over the tooth cavity and pressed against the margins of the same. The plugging end will force the material into the cavity and by virtue of the radial grooves in its face will distribute the same evenly so as to uniformly fill the cavity. No pressure other than the usual plugging pressure need be exerted. The relative movement of the sleeve and plugging end is wholly automatic and the exact degree of pressure needed may be applied. The smaller end of the implement may then be used if desired to insure any particular compacting of the mass in any special direction.

It is obvious that the implement may be made with but a single plugging end having a spring pressed sleeve and will thus be complete in itself, and will serve both as the means for carrying the material to the cavity and for compacting the same therein.

Other modes of applying the principle of my invention may be employed instead of the one explained change being made as regards the structure herein disclosed provided the means stated by any of the following claims or the equivalent of such stated means be employed.

I therefore particularly point out and distinctly claim as my invention:—

1. A dental implement comprising a body portion provided with a plugging end angularly disposed thereto, a sleeve slidably mounted on said plugging end, and resilient means cooperating with said angular end to hold said sleeve in frictional engagement therewith, and for normally positioning the greater portion of said sleeve extended beyond said plugging end.

2. A dental implement comprising a body portion provided with a plugging end angularly disposed thereto, a sleeve slidably mounted on said plugging end, and a spring connected at one end with the underside of said body portion and at its other end with said sleeve and co-operating with said angular end to normally maintain the greater portion of said sleeve in extended position beyond said plugging end.

3. A dental implement comprising a body portion curved to provide an outwardly bowed section and an angularly disposed plugging end, a sleeve slidably mounted on said plugging end, and a spring connected at one end with the underside of said body portion and at its other end with said sleeve and co-operating with said angular end to normally maintain the greater portion of said sleeve in extended position beyond said plugging end, said spring being provided with an outwardly bowed portion adjacent its point of connection with said body and having rolling contact with the curved portion of said body adjacent said plugging end.

Signed by me this 24th day of November, 1922.

WALTER WATTS.